United States Patent
Park et al.

(10) Patent No.: US 9,454,919 B2
(45) Date of Patent: Sep. 27, 2016

(54) ELECTRONIC SHELF LABEL TAG, ELECTRONIC SHELF LABEL SYSTEM FOR TIME-DIVISION TRANSMISSION OF DISPLAY DATA AND CHANGE COMMAND DATA, AND OPERATING METHOD THEREOF

(71) Applicant: SOLUM CO., LTD., Suwon-si (KR)

(72) Inventors: Jae Hee Park, Suwon-Si (KR); Sung Ki Kim, Suwon-Si (KR); Dae Yeol Seo, Suwon-Si (KR); Sang Hwa Park, Suwon-Si (KR); Sung Woon Kim, Suwon-Si (KR); Bo Yle Seo, Suwon-Si (KR); Joo Hyung Lee, Suwon-Si (KR); Chang Woo Lee, Suwon-Si (KR); Dong Won Lee, Suwon-Si (KR)

(73) Assignee: SOLUM CO., LTD., Suwon-si (KR)

( * ) Notice: Subject to any disclaimer, the term of this patent is extended or adjusted under 35 U.S.C. 154(b) by 0 days.

(21) Appl. No.: 14/721,373

(22) Filed: May 26, 2015

(65) Prior Publication Data

US 2015/0348450 A1   Dec. 3, 2015

(30) Foreign Application Priority Data

May 30, 2014   (KR) .................. 10-2014-0066540
Dec. 12, 2014  (KR) .................. 10-2014-0179819
Jan. 12, 2015  (KR) .................. 10-2015-0004103

(51) Int. Cl.
| G09F 27/00 | (2006.01) |
| G09F 3/20  | (2006.01) |
| G08B 5/36  | (2006.01) |
| G06Q 30/02 | (2012.01) |
| G06Q 30/06 | (2012.01) |

(Continued)

(52) U.S. Cl.
CPC .............. *G09F 3/208* (2013.01); *G06Q 30/02* (2013.01); *G06Q 30/06* (2013.01); *G06Q 30/0641* (2013.01); *G08B 5/36* (2013.01)

(58) Field of Classification Search
CPC ..................... G09G 2380/04; G09G 2370/16
USPC ........................................ 340/59.1
See application file for complete search history.

(56) References Cited

U.S. PATENT DOCUMENTS

| 5,544,041 A     | 8/1996  | Nekomoto     |
| 2003/0233280 A1 | 12/2003 | Haulk et al. |

(Continued)

FOREIGN PATENT DOCUMENTS

| EP | 1788520 A1  | 5/2007  |
| JP | 5-314029 A  | 11/1993 |

(Continued)

OTHER PUBLICATIONS

Extended European Search Report issued on Oct. 13, 2015, in counterpart European Application No. 15169983.2 (6 pages, in English).

*Primary Examiner* — Kevin Kim
(74) *Attorney, Agent, or Firm* — NSIP Law

(57) ABSTRACT

An electronic shelf label tag includes a communications unit configured to wirelessly communicate with an electronic shelf label repeater; a control unit configured to control operations including receiving display data including display information mapped to a display information index from the communications unit prior to a preset time, storing the display data, receiving change command data including the display information index from the communications unit after the preset time, retrieving the display information mapped to the display information index included in the change command data from the stored display data, and displaying the retrieved display information on a screen; a memory unit configured to store the display data including the display information mapped to the display information index under the control of the control unit; and a display unit configured to display the retrieved display information on the screen under the control of the control unit.

33 Claims, 14 Drawing Sheets

(56) References Cited

U.S. PATENT DOCUMENTS

| | | |
|---|---|---|
| 2010/0065634 A1 | 3/2010 | Nakamura |
| 2012/0161932 A1 | 6/2012 | Byun et al. |
| 2015/0199942 A1* | 7/2015 | Mochizuki ............ G06F 3/1431 345/531 |

FOREIGN PATENT DOCUMENTS

| | | |
|---|---|---|
| JP | 2006-92121 A | 4/2006 |
| JP | 2010-26184 A | 2/2010 |
| KR | 10-2012-0035358 A | 4/2012 |

\* cited by examiner

FIG. 7A CHANGE COMMAND DATA PACKET (BROADCAST PACKET)

| GROUP ID | DISPLAY INFORMATION INDEX k |

FIG. 7B

| GROUP ID | DISPLAY INFORMATION INDEX k | SCHEDULE TIME k |

EVENT k

FIG. 7C

| GROUP ID | DISPLAY INFORMATION INDEX 1 | SCHEDULE TIME 1 | ... | DISPLAY INFORMATION INDEX N | SCHEDULE TIME N |

EVENT 1 ... EVENT N

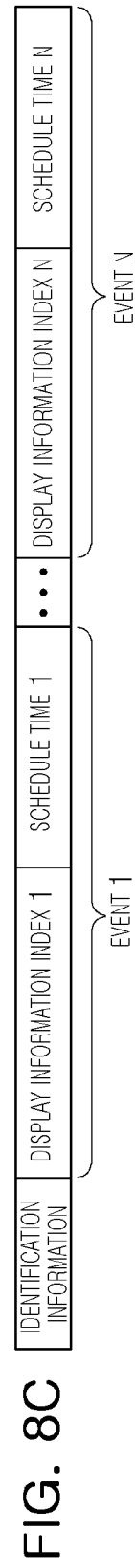
FIG. 8A
FIG. 8B
FIG. 8C

|       | Event #1 | Event #2 | Event #3 | Event #4 | Event #5 | Event #6 |
|-------|----------|----------|----------|----------|----------|----------|
| Tag 1 | Event #1 | Event #2 | Event #3 | Event #4 | Event #5 | Event #6 |
| Tag 2 | Event #1 | Event #2 | Event #3 | Event #4 | Event #5 | Event #6 |
| Tag 3 | Event #1 | Event #2 |          | Event #4 | Event #5 | Event #6 |
| Tag 4 | Event #1 |          | Event #3 | Event #4 | Event #5 |          |
| ...   |          |          |          |          |          |          |
| Tag N-1 | Event #1 | Event #2 | Event #3 | Event #4 | Event #5 | Event #6 |
| Tag N | Event #1 | Event #2 | Event #3 | Event #4 | Event #5 | Event #6 |

FIG. 14

ELECTRONIC SHELF LABEL TAG, ELECTRONIC SHELF LABEL SYSTEM FOR TIME-DIVISION TRANSMISSION OF DISPLAY DATA AND CHANGE COMMAND DATA, AND OPERATING METHOD THEREOF

CROSS-REFERENCE TO RELATED APPLICATION(S)

This application claims the benefit under 35 USC 119(a) of Korean Patent Application Nos. 10-2014-0066540 filed on May 30, 2014, 10-2014-0179819 filed on Dec. 12, 2014, and 10-2015-0004103 filed on Jan. 12, 2015, in the Korean Intellectual Property Office, the entire disclosures of which are incorporated herein by reference for all purposes.

BACKGROUND

1. Field

This application relates to an electronic shelf label tag and an electronic shelf label system for separately transmitting display data and change command data using time-division transmission, and an operating method thereof.

2. Description of Related Art

In general, a paper tag scheme in which product price information is manually written or printed on paper tags has been traditionally used as a scheme for displaying product information for customers on product display stands. However, such a paper tag scheme is disadvantageous in that paper tags need to be replaced whenever product price information is changed or the products on a product display stand are changed.

Research on and development of an electronic tag (hereinafter referred to as an electronic shelf label (ESL) tag) able to overcome the disadvantages of paper tags has been underway. Recently, electronic shelf label tags have been applied to a number of product display stands. Such an electronic shelf label system, including a plurality of electronic shelf label tags, may be installed in a store.

However, with existing electronic shelf label systems, cases in which the prices of specific goods (or products) displayed in the store should be simultaneously changed at a specific time may arise.

By way of example, in a case in which changes in the prices of products, such as fish and shellfish, collectively occur at a specific time in the evening, the products for which prices are to be changed, the time of the change in the price, and a discount rate thereof may be set in advance. However, when a server generates data to be transmitted to the electronic shelf label tag and transmits the data to a plurality of electronic shelf label tags via a repeater (e.g., a gateway) at the time at which the change in the price is set to occur, a transmission error may occur while the server is transmitting the data to thousands to tens of thousands of electronic shelf label tags at the set specific time, thereby making it impossible for the plurality of electronic shelf label tags to simultaneously display the same information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic shelf label tag includes a communications unit configured to wirelessly communicate with an electronic shelf label repeater; a control unit configured to control operations including receiving display data including display information mapped to a display information index from the communications unit prior to a preset time, storing the display data, receiving change command data including the display information index from the communications unit after the preset time, retrieving the display information mapped to the display information index included in the change command data from the stored display data, and displaying the retrieved display information on a screen; a memory unit configured to store the display data including the display information mapped to the display information index under the control of the control unit; and a display unit configured to display the retrieved display information on the screen under the control of the control unit.

The memory unit may be further configured to store an index-display information lookup table storing display information 1 to display information N respectively mapped to display information indexes P1 to PN.

The display information may include any one or any combination of any two or more of information related to a corresponding product, marketing information, and sales-related information.

The communications unit may be further configured to receive the change command data from the electronic shelf label repeater in a broadcast packet signal.

The change command data may further include an event in which schedule time information is mapped to the display information index; and the communications unit may be further configured to receive the change command data from the electronic shelf label repeater in a broadcast packet signal.

The change command data may further include identification information of the electronic shelf label tag; and the communications unit may be further configured to receive the change command data from the electronic shelf label repeater in a unicast packet signal.

The change command data may further include identification information of the electronic shelf label tag, and an event in which schedule time information is mapped to the display information index; and the communications unit may be further configured to receive the change command data from the electronic shelf label repeater in a unicast packet signal.

The electronic shelf label tag further include a time managing unit configured to provide current time information to the control unit, receive time information from the electronic shelf label repeater, and update the current time information based on the received time information.

In another general aspect, an operating method of an electronic shelf label tag includes receiving, by an electronic shelf label tag, a data signal including display data including display information mapped to a display information index from an electronic shelf label repeater prior to a preset time; storing, by the electronic shelf label tag, the display data included in the data signal; receiving, by the electronic shelf label tag, a control signal including change command data including the display information index from the electronic shelf label repeater after the preset time; retrieving, by the electronic shelf label tag, the display information mapped to the display information index included in the change command data of the control signal from the stored display data; and displaying, by the electronic shelf label tag, the retrieved display information on a screen.

In another general aspect, a non-transitory computer-readable storage medium stores instructions to cause a computer to perform the operating method described above.

In another general aspect, an electronic shelf label system includes an electronic shelf label server configured to generate and transmit display data including display information mapped to a display information index, and transmit change command data for changing the display information; an electronic shelf label repeater configured to transmit, prior to a preset time, a data signal including the display data transmitted by the electronic shelf label server, and transmit, after the preset time, a control signal including the change command data transmitted by the electronic shelf label server; and an electronic shelf label tag configured to wirelessly communicate with the electronic shelf label repeater, the electronic shelf label tag including a communications unit configured to receive the data signal from the electronic shelf repeater prior to the preset time, and receive the control signal from the electronic shelf label repeater after the preset time; a control unit configured to control operations including storing the display data included in the data signal, receiving the change command data included in the control signal after the preset time, retrieving the display information mapped to the display information index included in the change command data from the stored display data, and displaying the retrieved display information on a screen; a memory unit configured to store the display data including the display information mapped to the display information index under the control of the control unit; and a display unit configured to display the retrieved display information on the screen under the control of the control unit.

The electronic shelf label server may be further configured to store an update scenario including an event including the display information index and a schedule time mapped to the display information index for updating the display information for each of a plurality of electronic shelf label tags including the electronic shelf label tag; and the change command data may further include the update scenario.

The display information may include any one or any combination of any two or more of information related to a corresponding product, marketing information, and sales-related information.

The electronic shelf label repeater may be further configured to transmit the control signal including the change command data in a broadcast packet signal; and the communications unit may be further configured to receive the receive the broadcast packet signal.

The change command data may further include an event in which schedule time information is mapped to the display information index; the electronic shelf label repeater may be further configured to transmit the control signal including the change command data in a broadcast packet signal; and the communications unit may be further configured to receive the receive the broadcast packet signal.

The change command data may further include identification information of the electronic shelf label tag; the electronic shelf label repeater may be further configured to transmit the control signal including the change command data in a unicast packet signal; and the communications unit may be further configured to receive the receive the unicast packet signal.

The change command data may further include an event in which schedule time information is mapped to the display information index; the electronic shelf label repeater may be further configured to transmit the control signal including the change command data in a unicast packet signal; and the communications unit may be further configured to receive the receive the unicast packet signal.

The electronic shelf label repeater may be further configured to transmit time information; and the electronic shelf label tag may further include a time managing unit configured to provide current time information to the control unit, receive the time information from the electronic shelf label repeater, and update the current time information based on the received time information.

In another general aspect, an operating method of an electronic shelf label system includes generating, by an electronic shelf label server, display data including display information mapped to a display information index; transmitting, by the electronic shelf label server, the display data to an electronic shelf label repeater; transmitting, by the electronic shelf label repeater prior to a preset time, a data signal including the display data transmitted by the electronic shelf label server; receiving, by the electronic shelf label tag prior to the preset time, the data signal from the electronic shelf label repeater; storing, by the electronic shelf label tag, the display data included in the data signal; transmitting, by the electronic shelf label server, change command data including the display information index to the electronic shelf label repeater; transmitting, by the electronic shelf label repeater after the preset time, a control signal including the change command data to the electronic shelf label tag; receiving, by the electronic shelf label tag, the control signal from the electronic shelf label repeater; retrieving, by the electronic shelf label tag, the display information mapped to the display information index included in the change command data included in the control signal from the stored display data; and displaying, by the electronic shelf label tag, the retrieved display information on a screen.

The transmitting and the receiving of the data signal may include transmitting, by the electronic shelf label repeater, a wake-up signal; receiving, by the electronic shelf label tag, the wake-up signal from the electronic shelf label repeater; transmitting, by the electronic shelf label tag, a data information request signal in response to the wake-up signal; receiving, by the electronic shelf label repeater, the data information request signal from the electronic shelf label tag; transmitting, by the electronic shelf label repeater, a data information response signal in response to the data information request signal; receiving, by the electronic shelf label tag, the data information response signal from the electronic shelf label repeater; transmitting, by the electronic shelf label tag, a data request signal in response to the data information response signal; receiving, by the electronic shelf label repeater, the data request signal; transmitting, by the electronic shelf label repeater, a data response signal including the data signal in response to the data request signal; and receiving, by the electronic shelf label tag, the data response signal including the data signal from the electronic shelf label repeater.

The display information may include any one or any combination of any two or more of information related to a corresponding product, marketing information, and sales-related information.

The control signal may target a plurality of electronic shelf label tags including the electronic shelf label tag.

The control signal may target only the electronic shelf label tag.

The transmitting of the control signal may include transmitting, by the electronic shelf label repeater, the control signal in a broadcast packet signal; and the receiving of the control signal may include receiving, by the electronic shelf label tag, the broadcast packet signal from the electronic shelf label repeater.

The change command data may further include an event in which schedule time information is mapped to the display information index; the transmitting of the control signal may include transmitting, by the electronic shelf label repeater, the control signal in a broadcast packet signal; and the receiving of the control signal may include receiving, by the electronic shelf label tag, the broadcast packet signal from the electronic shelf label repeater.

The change command data may further include identification information of the electronic shelf label tag; the transmitting of the control signal may include transmitting, by the electronic shelf label repeater, the control signal in a unicast packet signal; and the receiving of the control signal may include receiving, by the electronic shelf label tag, the unicast packet signal from the electronic shelf label repeater.

The change command data may further include identification information of the electronic shelf label tag and an event in which schedule time information is mapped to the display information index; the transmitting of the control signal may include transmitting, by the electronic shelf label repeater, the control signal in a unicast packet signal; and the receiving of the control signal may include receiving, by the electronic shelf label tag, the unicast packet signal from the electronic shelf label repeater.

The operating method may further include transmitting, by the electronic shelf label repeater, time information; receiving, by the electronic shelf label tag, the time information from the electronic shelf label repeater; and updating, by the electronic shelf label tag, current time information of the electronic shelf label tag based on the received time information.

In another general aspect, an electronic shelf label tag includes a display unit configured to display display information on a screen; a memory unit; a communications unit configured to wirelessly receive updated display information from an electronic shelf label repeater prior to a scheduled update time, and wirelessly receive an update command identifying the updated display information from the electronic shelf label repeater at the scheduled update time; and a control unit configured to receive the updated display information from the communications unit, store the updated display information in the memory unit, receive the update command from the communications unit, retrieve the updated display information from the memory unit based on the update command, and control the display unit to display the updated display information on the screen at the scheduled update time.

The electronic shelf label repeater may be configured to transmit the updated display information sufficiently far in advance of the scheduled update time to ensure that the updated display information will available in the memory unit at the scheduled update time.

The updated display information may be mapped to a display information index; the update command may include the display information index; and the control unit may be further configured to store the updated display information in the memory unit indexed according to the display information index, and retrieve the updated display information index from the memory unit based on the display information index included in the update command.

The communications unit may be configured to receive the update command in a broadcast packet signal targeting the electronic shelf label tag and other electronic shelf label tags.

The communications unit may be configured to receive the update command in a unicast packet signal targeting only the electronic shelf label tag.

Other features and aspects will be apparent from the following detailed description, the drawings, and the claims.

BRIEF DESCRIPTION OF DRAWINGS

FIGS. 7A through 7C are views illustrating examples of a change command data packet.

FIGS. 8A though 8C are views illustrating other examples of a change command data packet.

FIG. 14 is a view illustrating an example of a plurality of events according to respective update scenarios for a plurality of electronic shelf label tags.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms and are not to be construed as being limited to the examples described herein. Rather, the examples described herein have been provided so that this disclosure will be thorough and complete, and will fully convey the full scope of the disclosure to one of ordinary skill in the art.

Figure 1:
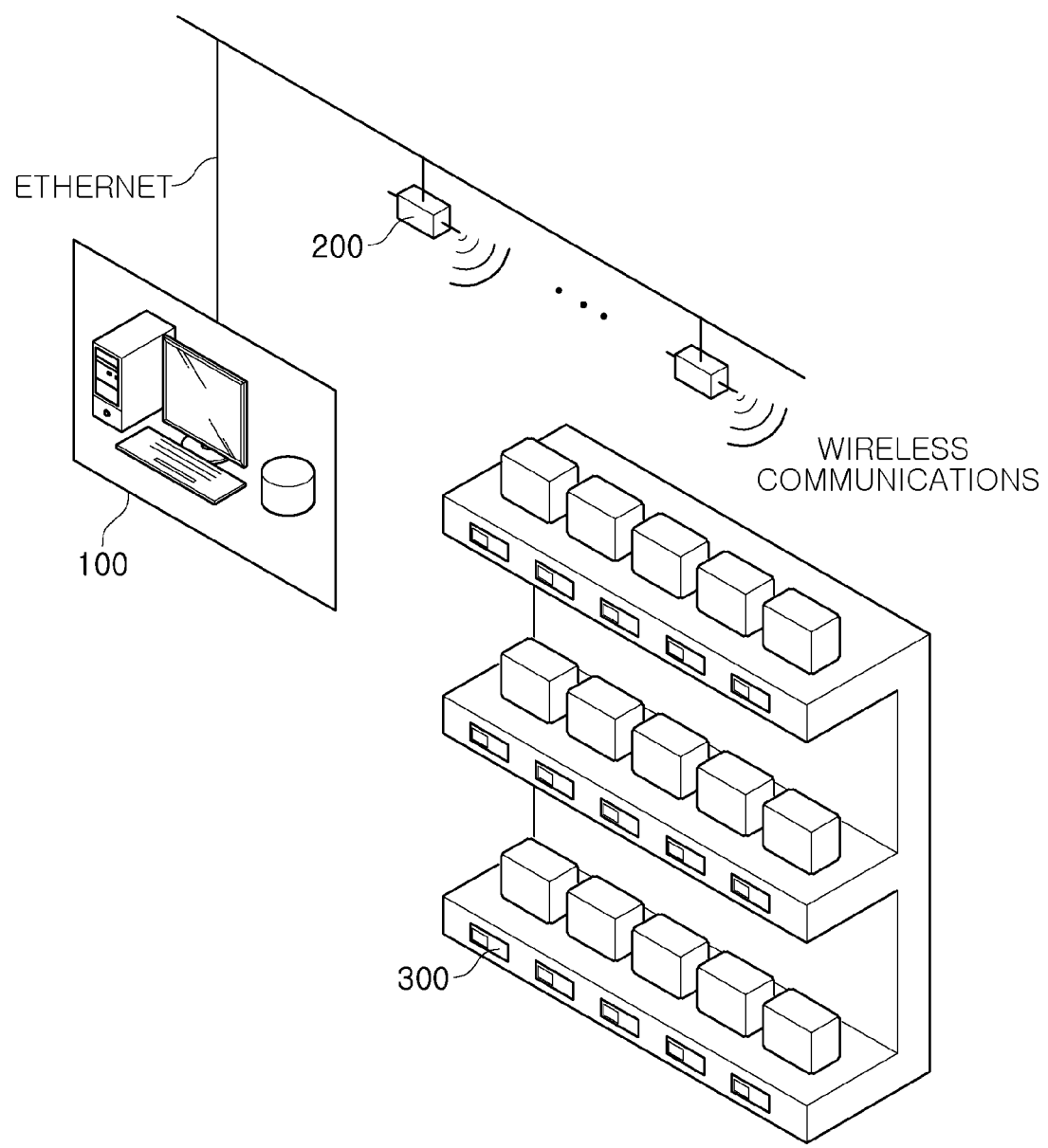
FIG. 1 is a configuration diagram of an example of an electronic shelf label system.

FIG. 1 is a configuration diagram of an example of an electronic shelf label system.

Referring to FIG. 1, an example of an electronic shelf label system includes an electronic shelf label server 100 (e.g., an ESL server), a plurality of electronic shelf label repeaters 200 (e.g., gateways), and a plurality of electronic shelf label tags 300 (e.g., electronic tags).

In the example in FIG. 1, the electronic shelf label server 100 is connected to the electronic shelf label repeaters 200 by a wired communications network (e.g., an Ethernet LAN), to transmit display data including display information mapped to a display information index and change command data including the display information index for changing the display information to the plurality of electronic shelf label repeaters 200.

The display data may further include non-display information related to a product that is mapped in advance in addition to the display information. The display information may include any one or any combination of any two or more of information related to the corresponding product, marketing information, and sales-related information. The non-display information may include any one or any combination of any two or more of identification information, address information, and any other information related to the product that is not to be displayed.

The display information may be an image or text, may occupy a whole page, may be partially text, or may be a design, and is not particularly limited to a specific form or type of information, as long as it may be electronically displayed on a display panel.

In the example in FIG. 1, each of the plurality of electronic shelf label repeaters 200 is connected to a plurality of electronic shelf label tag groups through a wireless communications network (e.g., a wireless communications personal area network (PAN)).

Each of the plurality of electronic shelf label repeaters 200 transmits a data signal including the display data and the control signal including the change command data transmitted by the electronic shelf label server 100 to at least one electronic shelf label tag 300.

Each of the plurality of electronic shelf label repeaters 200 forms a personal area network (PAN) to perform wireless communications with each of the plurality of electronic shelf label tag groups to which it is connected. Each of the plurality of electronic shelf label tag groups comprises a plurality of electronic shelf label tags 300. Each of the plurality of electronic shelf label tag groups may be identified through identification information such as group identification (ID), and each of the plurality of electronic shelf label tags 300 may be identified through identification information such as a media access control (MAC) address.

For example, the identification information in examples described herein may be the group ID or the MAC address.

Each electronic shelf label tag group includes a plurality of electronic shelf label tags 300. Each electronic shelf label tag 300 communicates with the electronic shelf label repeater 200 wirelessly to receive the data signal from the electronic shelf label repeater 200 and store the display data included in the data signal.

In addition, each electronic shelf label tag 300 receives the control signal from the electronic shelf label repeater 200, retrieves the display information mapped to the display information index included in the change command data included in the control signal from the stored display data based on the change command data included in the control signal, and displays the retrieved display information on a screen.

Figure 2:
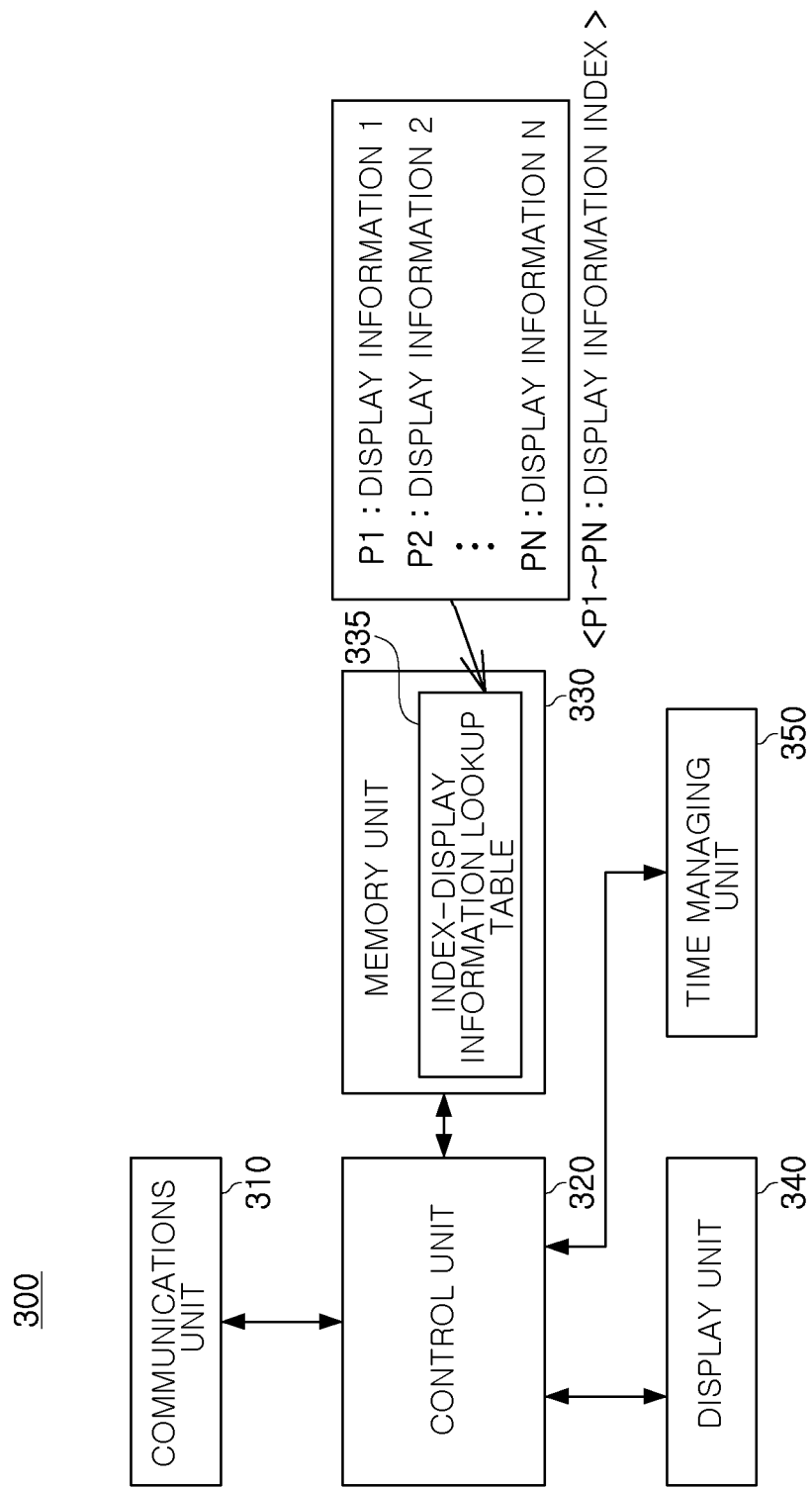
FIG. 2 is a block diagram of an example of an electronic shelf label tag.

FIG. 2 is a block diagram of an example of an electronic shelf label tag.

In the example in FIG. 2, the electronic shelf label tag 300 includes a communications unit 310, a control unit 320, a memory unit 330, and a display unit 340.

In the example in FIG. 2, the electronic shelf label tag 300 further includes a time managing unit 350. However, in other examples, the time managing unit 350 may be omitted.

The communications unit 310 performs wireless communications with the electronic shelf label repeater 200 to receive the data signal and the control signal from the electronic shelf label repeater 200. The communications unit 310 may transmit a data request signal and an acknowledgment (ACK) signal while receiving the data signal and the control signal.

The control unit 320 controls operations of receiving the display data including the display information mapped to the display information index from the communications unit 310 prior to a preset time Tset; storing the display data; receiving the change command data after the preset time Tset; retrieving the display information mapped to the display information index included in the change command data from the stored display data; and displaying the retrieved display information on the screen. The control unit 320 may be a processing unit such as a signal processor, a microprocessor, a CPU (Central Processing Unit), or a processing element implemented in the processing unit. As one example, the control unit 320 may be a controller.

The memory unit 330 stores the display data including the display information mapped to the display information index. As one example, the memory unit 330 may be a flash memory, RAM, ROM, or non-volatile memory.

In the example in FIG. 1, the memory unit 330 includes an index-display information lookup table 335 in which display information 1 to display information N, which are respectively mapped to display information indexes P1 to PN, are stored in order.

The display data includes at least one display information mapped to a display information index.

The display unit 340 displays the retrieved display information on the screen under the control of the control unit 320.

The display unit 340 may be a display panel capable of electrically displaying information, such as an electronic paper panel, a liquid crystal display (LCD) panel, or any other display panel known to one of ordinary skill in the art.

The time managing unit 350 provides current time information to the control unit 320. As one example, the time managing unit 350 may be a time managing controller.

For example, the time managing unit 340 may include a precision clock. In another example, the time managing unit 340 may receive precise time information from the electronic shelf label repeater 200 to correct errors in the current time information of the electronic shelf tag 300. For example, the time information may be included in a wake-up frame. In this case, the electronic shelf label tag 300 may receive a wake-up signal including the wake-up frame and may correct an error in the current time of the electronic shelf tag 300 using the time information included in the wake-up frame.

Figure 3:
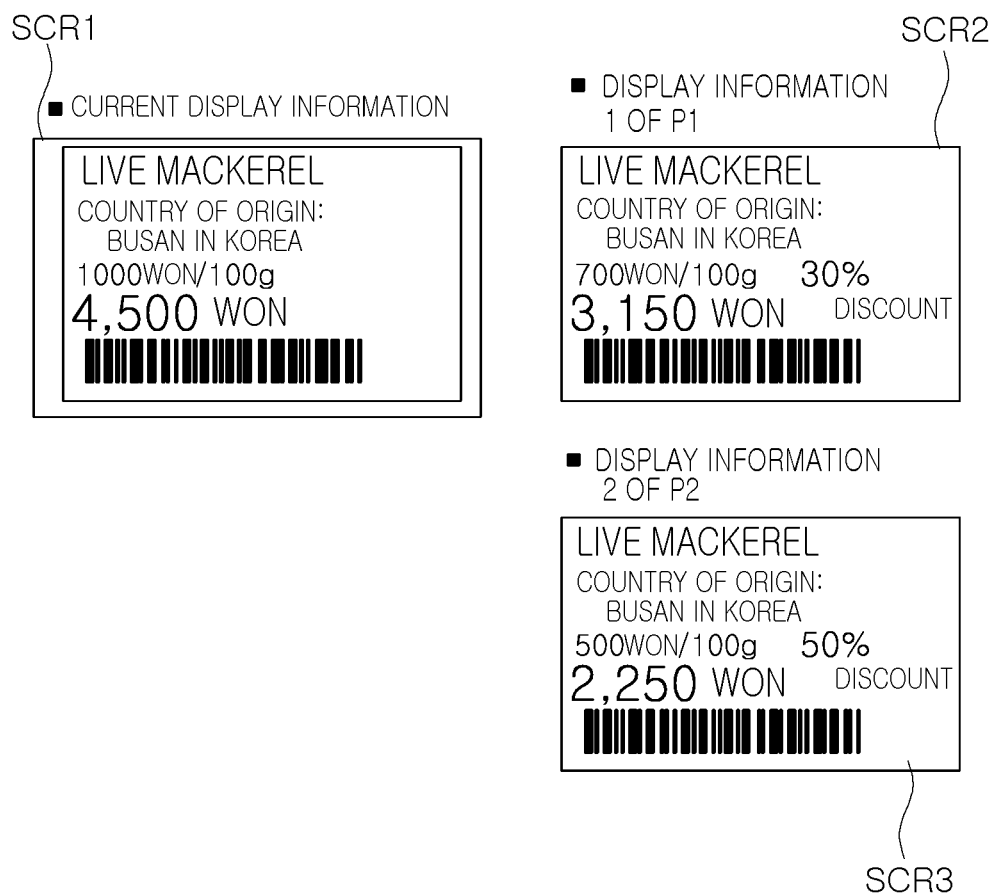
FIG. 3 is a view illustrating examples of display information in a display information index of the electronic shelf label system.

FIG. 3 is a view illustrating examples of display information in a display information index of the electronic shelf label system.

Referring to FIGS. 1 through 3, the display unit 340 of the electronic shelf label tag 300 displays current display information (SCR1), and the memory unit 330 stores display information 1 (SCR2) mapped to the display information index P1 and display information 2 (SCR3) mapped to the display information index P2 in the index-display information lookup table 335 (see FIG. 2).

As such, the memory unit 330 includes display information 1 to display information N respectively mapped to display information indexes P1 to PN.

Figure 4:
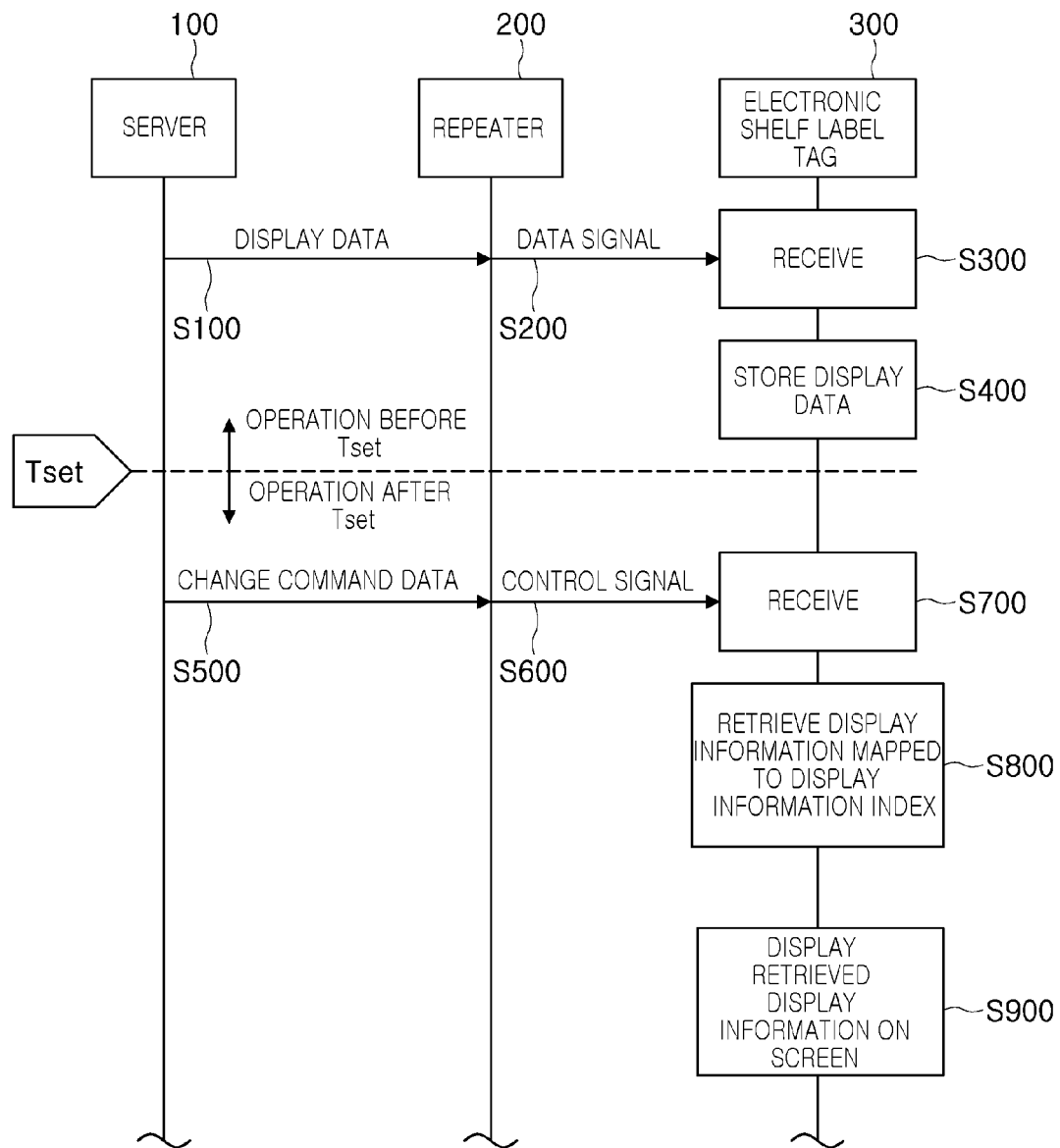
FIG. 4 is flowchart illustrating an example of operations of the electronic shelf label system and the electronic shelf label tag.

FIG. 4 is a flowchart illustrating an example of operations of the electronic shelf label system and the electronic shelf label tag.

In the example in FIG. 4, the electronic shelf label system includes the electronic shelf label server 100, the electronic shelf label repeater 200, and the electronic shelf label tag 300.

In describing the operations of the electronic shelf label server 100, the electronic shelf label repeater 200, and the electronic shelf label tag 300 illustrated in FIG. 4, repeated descriptions of operations already described with reference to FIGS. 1 through 3 will be omitted.

First, the electronic shelf label server 100 generates display data for the electronic shelf label tag 300 and transmits the generated display data to the electronic shelf label repeater 200 (S100), and the electronic shelf label repeater 200 transmits a data signal including the display data to at least one electronic shelf label tag (S200).

The electronic shelf label tag 300 receives the data signal including the display data having display information mapped to a display information index from the electronic shelf label repeater 200 prior to the preset time Tset (S300).

Next, the electronic shelf label tag 300 stores the display data included in the data signal (S400).

In addition, the electronic shelf label server 100 generates change command data including the display information index for the electronic shelf label tag 300 and transmits the generated change command data to the electronic shelf label repeater 200 (S500), and the electronic shelf label repeater 200 transmits a control signal including the change command data to at least one electronic shelf label tag (S600).

The electronic shelf label tag 300 receives the control signal including the change command data including the display information index from the electronic shelf label repeater 200 after the preset time Tset (S700).

Next, the electronic shelf label tag 300 retrieves the display information mapped to the display information index included in the change command data included in the control signal from the stored display data (S800).

Finally, the electronic shelf label tag 300 displays the retrieved display information on the screen of the display unit (S900).

For example, in a state in which each of the plurality of electronic shelf label tags 300 receives and stores the same display information in advance, when a change in the display information is simultaneously required, each of the plurality of electronic shelf label tags 300 executes the change of the display information in the display unit within an error margin of several seconds at most according to the control signal from the server.

As described above, if a price change is planned, the server 100 transmits the display data including the display information to the electronic shelf label tag 300 in advance through the repeater 200 prior to the preset time, which is before a time at which the price change is desired. The preset time is sufficiently far in advance of the time at which the price change is desired to ensure that the display information will available in the electronic shelf label tag 300 at the time at which the price change is desired. The time at which the price change is desired may be a scheduled update time.

Next, the server 100 controls an update for each of the plurality of electronic shelf label tags 300 using the control signal including the display information index and/or a schedule time.

Figure 5:
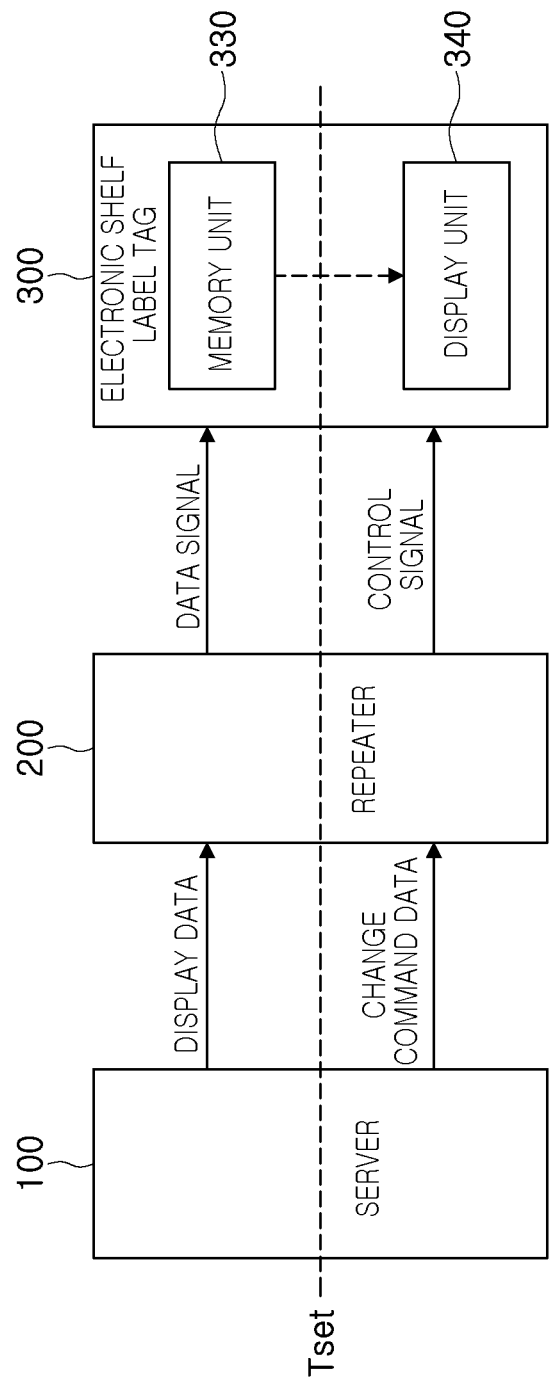
FIG. 5 is a view illustrating an example of operations of the electronic shelf label system.

FIG. 5 is a viewing illustrating an example of operations of the electronic shelf label system.

In the example in FIG. 5, the electronic shelf label system includes the electronic shelf label server 100 (e.g., an ESL server), the plurality of electronic shelf label repeaters 200 (e.g., gateways) (only one of which is shown in FIG. 5 for clarity), and the plurality of electronic shelf label tags 300 (e.g., electronic tags) (only one of which is shown in FIG. 5 for clarity).

The operating method of the electronic shelf label system includes the operations described with reference to FIGS. 1 through 4. Therefore, repeated descriptions of the operations already described with reference to FIGS. 1 through 4 will be omitted.

For example, the electronic shelf label server 100 generates and transmits display data including display information mapped to a display information index and then transmits change command data for changing the display information to the plurality of electronic shelf label repeaters 200.

For example, the server 100 stores an update scenario including at least one event having a display information index and a schedule time mapped to the display information index for updating the display information for each of the plurality of electronic shelf label tags 300, and the change command data includes the update scenario.

Each of the plurality of electronic shelf label repeaters 200 transmits a data signal including the display data transmitted by the electronic shelf label server 100 to at least one electronic shelf label tag 300 prior to a preset time Tset, and transmits a control signal including the change command data to at least one electronic shelf label tag 300 after the preset time Tset.

In this case, the electronic shelf label repeater 200 transmits the data to each of the plurality of electronic shelf label tags at different data transmission times to avoid communications collisions.

In addition, each of the plurality of electronic shelf label tags 300 receives the data signal from the electronic shelf label repeater 200 and stores the display data included in the data signal in the memory unit 330 prior to the preset time Tset.

In addition, each of the plurality of electronic shelf label tags 300 receives the control signal from the electronic shelf label repeater 200, retrieves the display information from the display data stored in the memory unit 330 based on the change command data included in the control signal, and displays the retrieved display information on the screen of the display unit 340 after the preset time Tset.

The server 100 may control the display information that is transmitted to the plurality of electronic shelf label tags in advance using a control signal including a scenario in which several schedules are present. As an example, a schedule A will be described with reference to FIG. 6.

Figure 6:
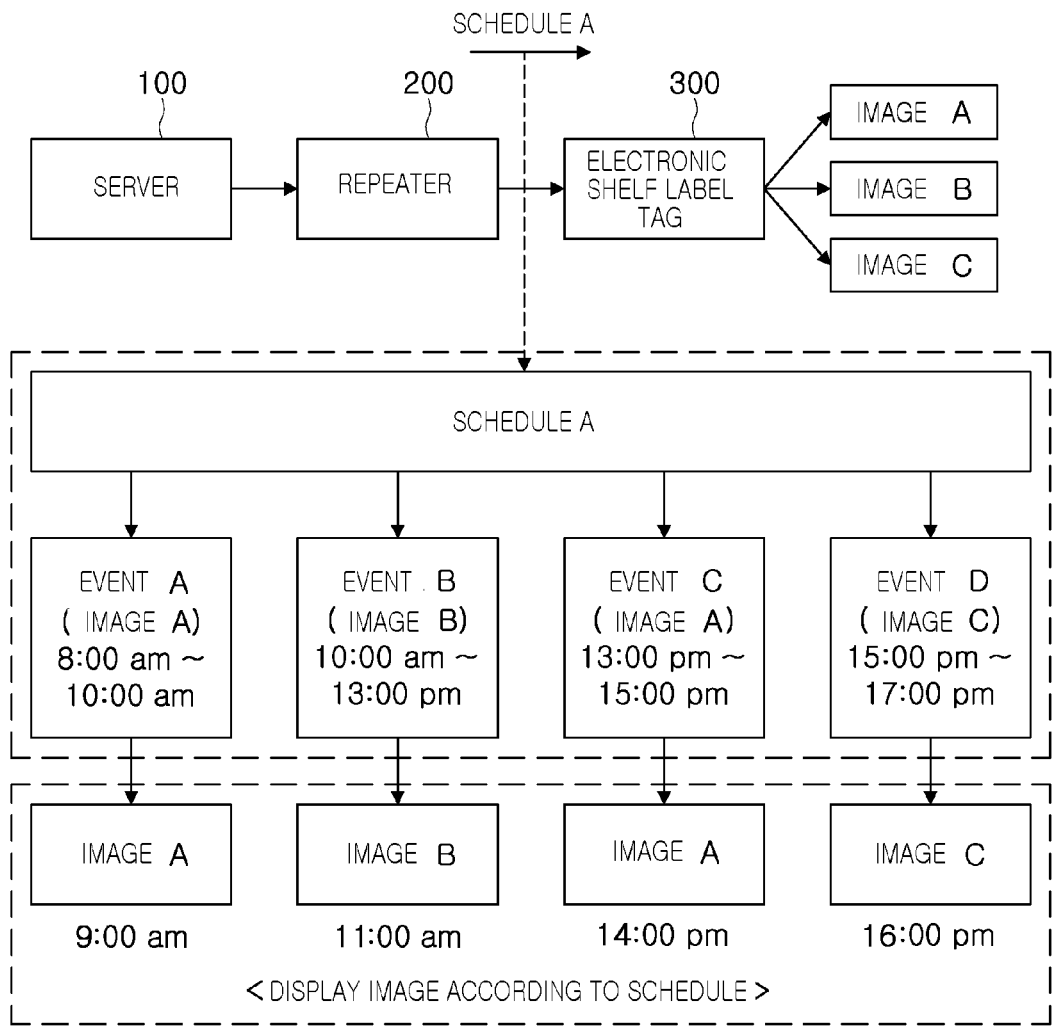
FIG. 6 is a view illustrating an example of an operating method of an electronic shelf label system.

FIG. 6 is a view illustrating an example of an operating method of an electronic shelf label system.

In the example in FIG. 6, the server 100 generates data of schedule A and transmits schedule A to the electronic shelf label tag 300 through the repeater 200 to operate the electronic shelf label tag, and the electronic shelf label tag 300 displays image A, image B, image C on the screen according to schedule A.

In addition, the repeater 200 may include a function capable of storing the data of schedule A in an internal database in case the repeater 200 is disconnected from the server 100 and processing the data whenever there is a request from the electronic shelf label tag 300.

Further, schedule A may include a plurality of events (for example, Event A, Event B, Event C, and Event D) in which the electronic shelf label tags are to be changed.

For example, Event A, Event B, Event C, and Event D may have index A, index B, index C, and index D to which schedule times referring to times to be displayed are respectively mapped.

For example, if a schedule time 8:00 to 10:00 A.M. is mapped to index A, a schedule time 10:00 A.M. to 13:00 P.M. is mapped to index B, a schedule time 13:00 P.M. to 15:00 P.M. is mapped to index C, and a schedule time 15:00 P.M. to 17:00 P.M. is mapped to index D, the electronic shelf label tag will display image A mapped to index A at 8:00 A.M., display image B mapped to index B at 10:00 A.M., display image A mapped to index C at 13:00 P.M., and display image C mapped to index D at 15:00 P.M.

An image is merely one example of the display information, and the display information is not limited thereto. The control signal may include twelve events at most in a control data packet that may be transmitted simultaneously, but is not limited thereto. In addition, index A, index B, index C, and index D may be display information indexes to which image A, image B, image A, and image C are respectively mapped.

Examples of the control signal will be described with reference to FIGS. 7A through 7C and 8A through 8C.

FIGS. 7A through 7C are views illustrating examples of a change command data packet, and FIGS. 8A though 8C are views illustrating other examples of a change command data packet.

Referring to FIGS. 7A though 7C and 8A through 8C, the change command data included in the control signal may be formed as a broadcast packet as illustrated in FIGS. 7A through 7C, and may be formed as a unicast packet as illustrated in FIGS. 8A through 8C.

In the example in FIG. 7A, the change command data includes a group ID and a display information index k (where k is a natural number of 1 or more).

In the example in FIG. 7B, the change command data includes a group ID, and an event k having a display information index k and schedule time information k.

In the example in FIG. 7C, the change command data includes a group ID and a plurality of events 1 to N, and each of the events 1 to N includes a display information index and schedule time information.

The group IDs in FIGS. 7A, 7B, and 7C are information for identifying one of a plurality of electronic shelf label groups. Thus, if the control signal includes a group ID, the control signal is transmitted to all of the electronic shelf label tags in the group connected to a single electronic shelf label repeater. That is, the control signal targets all of the electronic shelf label tags in the group connected to the single electronic shelf label repeater.

In the example in FIG. 8A, the change command data includes identification information and a display information index k (where k is a natural number of 1 or more).

In the example in FIG. 8B, the change command data includes identification information, and an event k having a display information index k and schedule time information k.

In the example in FIG. 8C, the change command data includes identification information and a plurality of events 1 to N, wherein each of the events 1 to N includes a display information index and schedule time information.

The identification information in FIGS. 8A, 8B, and 8C is information for identifying one of the plurality of electronic shelf label tags, such as a MAC address. Thus, if the control signal includes identification information, the control signal is transmitted to one electronic shelf label tag and designates only one electronic shelf label tag as a transmission target using the identification information. That is, the control signal targets only the one electronic shelf label tag.

Figure 9:
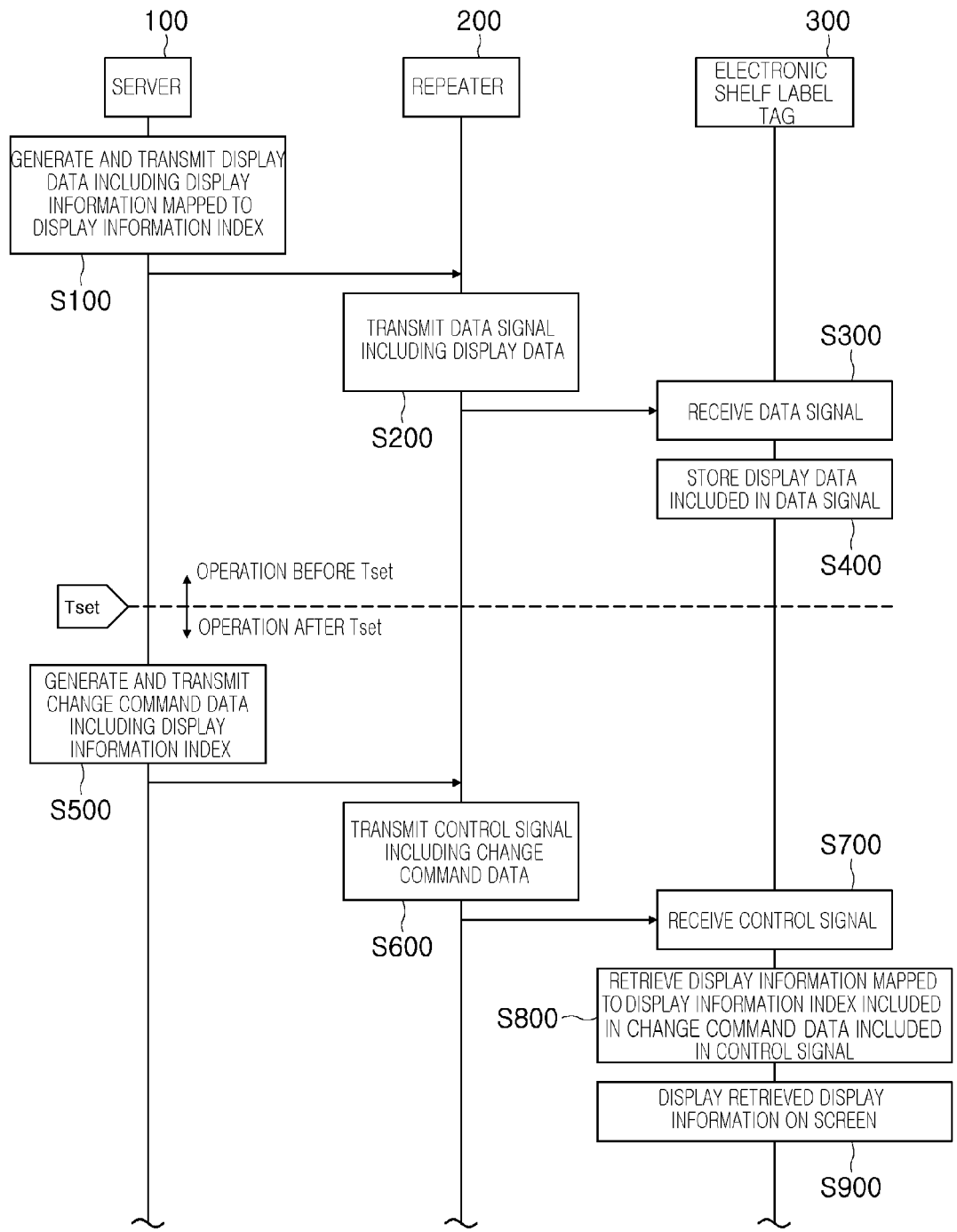
FIG. 9 is a flowchart illustrating an example of an operating method of an electronic shelf label system.

FIG. 9 is a flowchart illustrating an example of an operating method of an electronic shelf label system.

The operating method of the electronic shelf label system described hereinafter includes the operations described with reference to FIGS. 1 through 8C. Therefore, repeated descriptions of the operations already described with reference to FIGS. 1 through 8 will be omitted.

Referring to FIGS. 1 through 9, in S100, the electronic shelf label server 100 generates display data including display information mapped to a display information index and transmits the display data to the electronic shelf label repeater 200.

In S200, the electronic shelf label repeater 200 transmits a data signal including the display data transmitted by the electronic shelf label server 100 to at least one electronic shelf label tag 300 prior to a preset time Tset.

In S300, the at least one electronic shelf label tag 300 receives the data signal from the electronic shelf label repeater 200 prior to the preset time Tset.

In S400, the electronic shelf label tag 300 receiving the data signal stores the display data included in the data signal.

The above-described operations are performed prior to the preset time Tset. The preset time Tset is after a time at which the transmission of the display data to the corresponding electronic shelf label tag needs to be completed, and is prior to a time at which the server 100 generates change command data.

Next, the following operations are performed after the preset time Tset.

In S500, the electronic shelf label server 100 generates the change command data including the display information index and transmits the change command data to the electronic shelf label repeater 200.

In S600, the electronic shelf label repeater 200 transmits a control signal including the change command data to the at least one electronic shelf label tag 300 after the preset time Tset.

In S700, the at least one electronic shelf label tag 300 receives the control signal from the electronic shelf label repeater 200.

In S800, the at least one electronic shelf label tag 300 retrieves the display information mapped to the display information index included in the change command data included in the control signal from the stored display data.

In S900, the at least one electronic shelf label tag 300 displays the retrieved display information on the screen.

Figure 10:
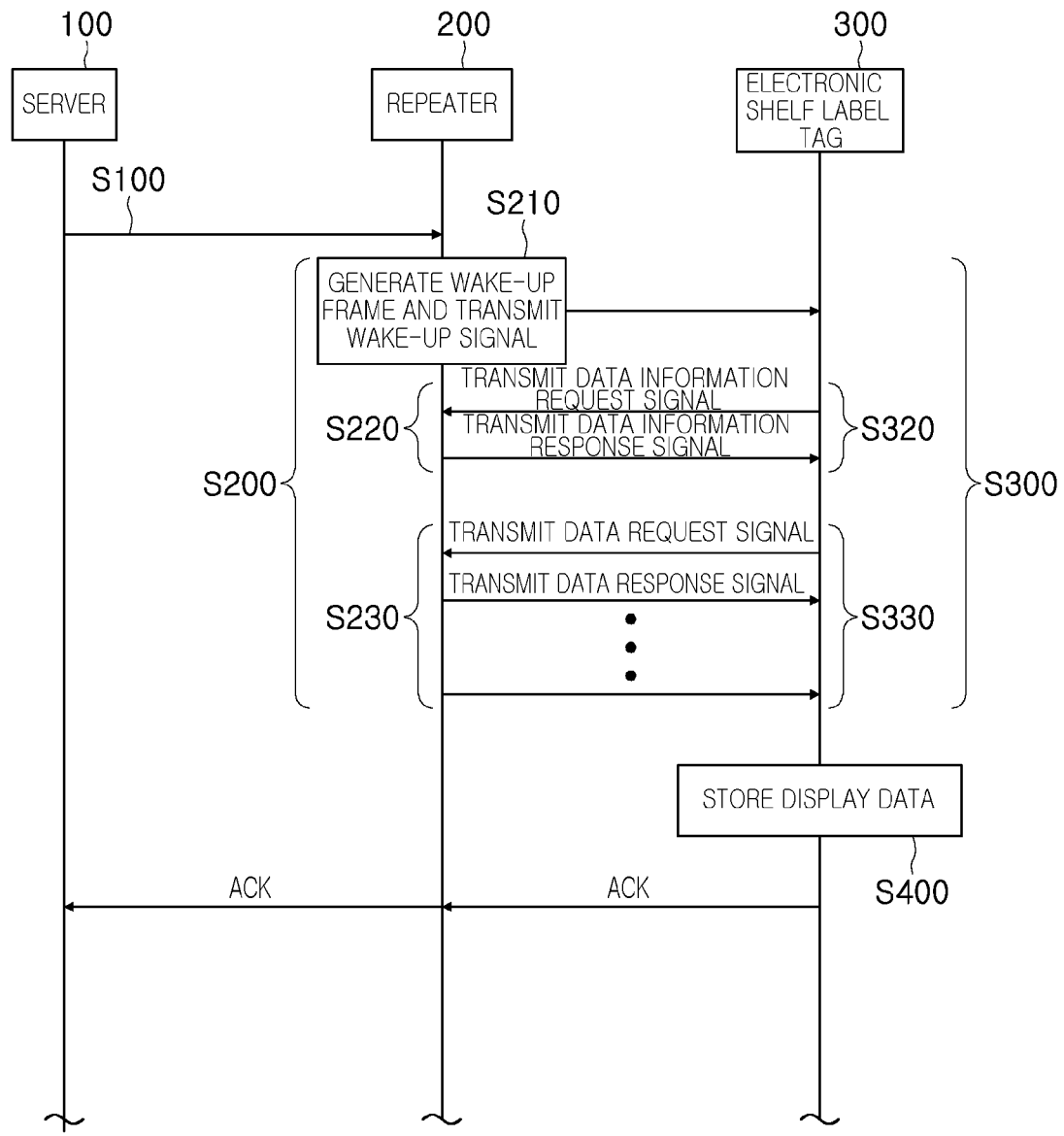
FIG. 10 is a view illustrating an example of the transmission of display data in the electronic shelf label system.
Figure 11:
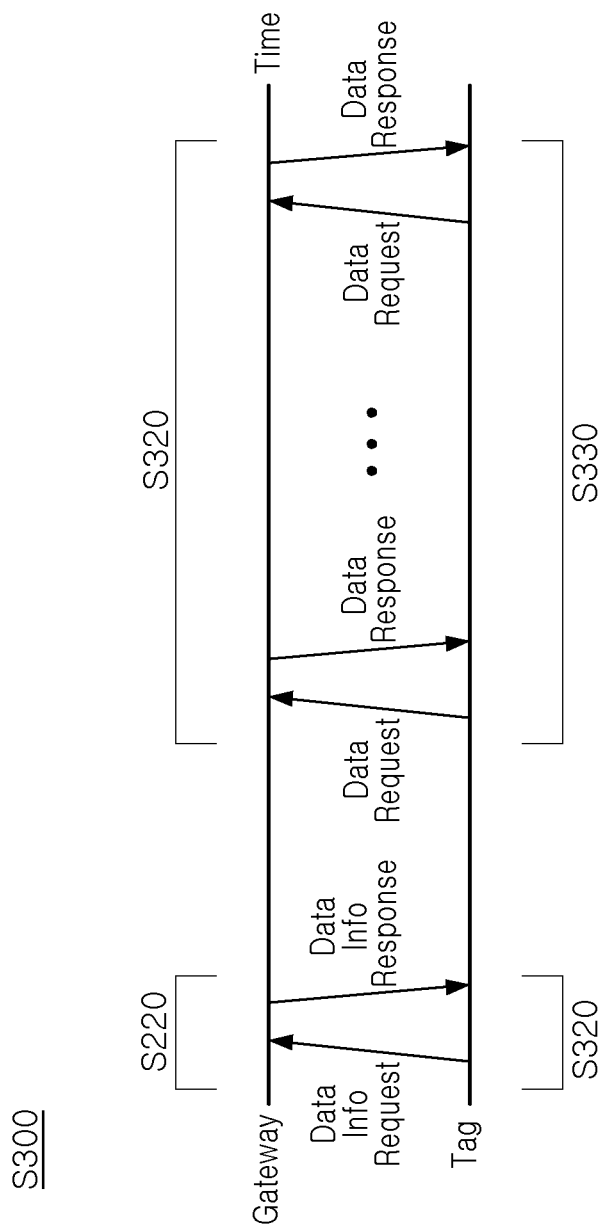
FIG. 11 is a view illustrating an example of the transmission of display data between an electronic shelf label repeater and an electronic shelf label tag.

FIG. 10 is a view illustrating an example of the transmission of display data in the electronic shelf label system, and FIG. 11 is a view illustrating an example of the transmission of display data between an electronic shelf label repeater and an electronic shelf label tag.

The operation (S300) of receiving the data signal will be described with reference to FIGS. 1 through 11.

First, the repeater 200 generates a wake-up frame and transmits a wake-up signal including the wake-up frame in a broadcast packet. In response to the wake-up signal, all of the electronic shelf label tags connected to the repeater 200 wake up (S210).

For example, the repeater may transmit the wake-up signal including the wake-up frame for 15 seconds every 300 seconds via a wake-up channel.

To prevent collisions between the wake-up signals in a wireless environment, the repeaters 200 may use a scheme in which they transmit their respective wake-up signals in different time slots.

For example, the electronic shelf label tag 300 receives the wake-up signal including identification (ID) information from the electronic shelf label repeater 200. In this case, when the identification (ID) information included in the wake-up signal matches identification (ID) information of the electronic shelf label tag 300, the electronic shelf label tag 300 wakes up and requests data from the electronic shelf label repeater 200.

In addition, the electronic shelf label repeater 200 may transmit the wake-up signal including the wake-up frame to a plurality of electronic shelf label tags 300 that are determined in advance through wake-up channels that are determined in advance. For example, the wake-up channel may be a transmission channel through which the electronic shelf label repeater 200 performs transmissions to the electronic shelf label tags 300 in a broadcasting scheme.

In addition, the repeater 200 may transmit the wake-up frame for 15 seconds every 300 seconds through the wake-up channel.

For example, the wake-up frame may include wake-up identification (ID) information corresponding to identification (ID) information of a target electronic shelf label tag 300 to be woken up and accurate current time information for correcting errors in a current time in the target electronic shelf label tag 300.

To prevent collisions between the wake-up frames in a wireless environment, the repeaters 200 may use a scheme in which they transmit their respective wake-up frames in different time slots.

In addition, the electronic shelf label tag 300 that wakes up may request the data from the electronic shelf label repeater 200 through a data channel that is determined in advance to be different from the wake-up channel, and may receive the data. The features related to the wake-up channel and the data channel as described above may be applied to other examples described herein.

As described above, after the wake-up signal is transmitted through the wake-up channel, display data is transmitted through the data channel.

When an electronic shelf label tag 300 receives the wake-up signal from the electronic shelf label repeater 200, the electronic shelf label tag 300 transmits a data information request (Data Info Request) signal to the electronic shelf label repeater 200, and receives a data information response (Data Info Response) signal from the electronic shelf label repeater 200 (S320).

The data information response (Data Info Response) signal may include time information (Time to Update Image) to be displayed on the display unit of the electronic shelf label tag, together with a total number of data packets to be transmitted, a total data size, a compressed data size, a compression mode, and a checksum.

Next, the electronic shelf label tag 300 transmits a data request signal to the electronic shelf label repeater 200 based on the data information response signal, and receives a data response signal from the electronic shelf label repeater 200 (S330).

For example, in a case in which the total data cannot be transmitted to the electronic shelf label tag 300 in a single packet transmission due to a limit in a size of payload of the data transmission packet, although the transmission differs slightly depending on a size of the display unit of the electronic shelf label tag 300, the repeater 200 may transmit the total data to the electronic shelf label tag 300 by transmitting several data transmission packets several times. In this case, information such as a total number of data packets, a total data size, a compressed data size, a compression mode, and a checksum may be transmitted in advance through the data information response signal.

Therefore, in a case in which the display data has a large size, the display data may be divided for transmission based on the total number of data packets.

In the example in FIG. 10, when the transmission of the display data is completed, the electronic shelf label tag transmits an acknowledgement (ACK) signal to the server 100 through the repeater 200. The server 100 may recognize the completion of the transmission of the display data based on the acknowledgement (ACK) signal.

For example, the repeater may transmit the wake-up frame for 15 seconds every 300 seconds through the wake-up channel.

In this case, to prevent collisions between the wake-up frames in a wireless environment, the repeaters 200 may use a scheme in which they transmit their respective wake-up frames in different time slots.

Figure 12:
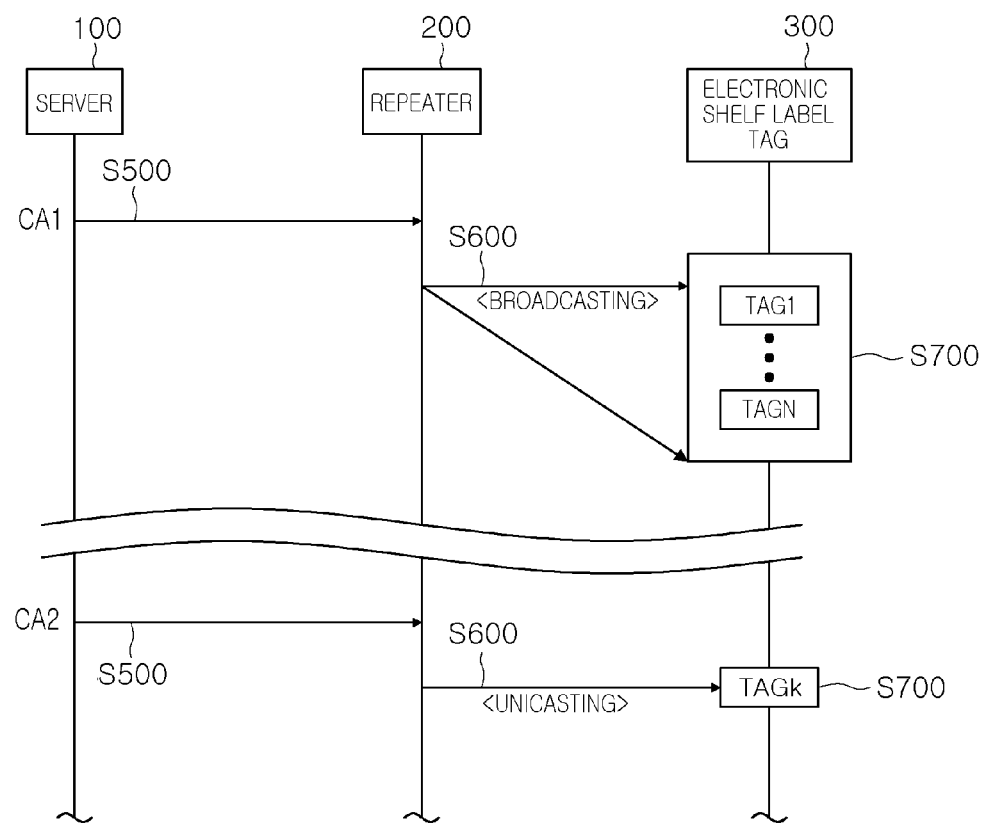
FIG. 12 is a view illustrating examples of broadcasting and unicasting for transmitting a control signal including change command data.

FIG. 12 is a view illustrating examples of broadcasting and unicasting for transmitting a control signal including change command data.

Referring to FIGS. 7A through 7C, 8A through 8C, and 12, in a first case CA1, the control signal including the change command data is broadcast to a plurality of first to N-th electronic shelf label tags TAG1 to TAGN.

In a second case CA2, the control signal including the change command data is unicast to a specific electronic shelf label tag TAGk (where k is a natural number of 1 or more).

Figure 13:
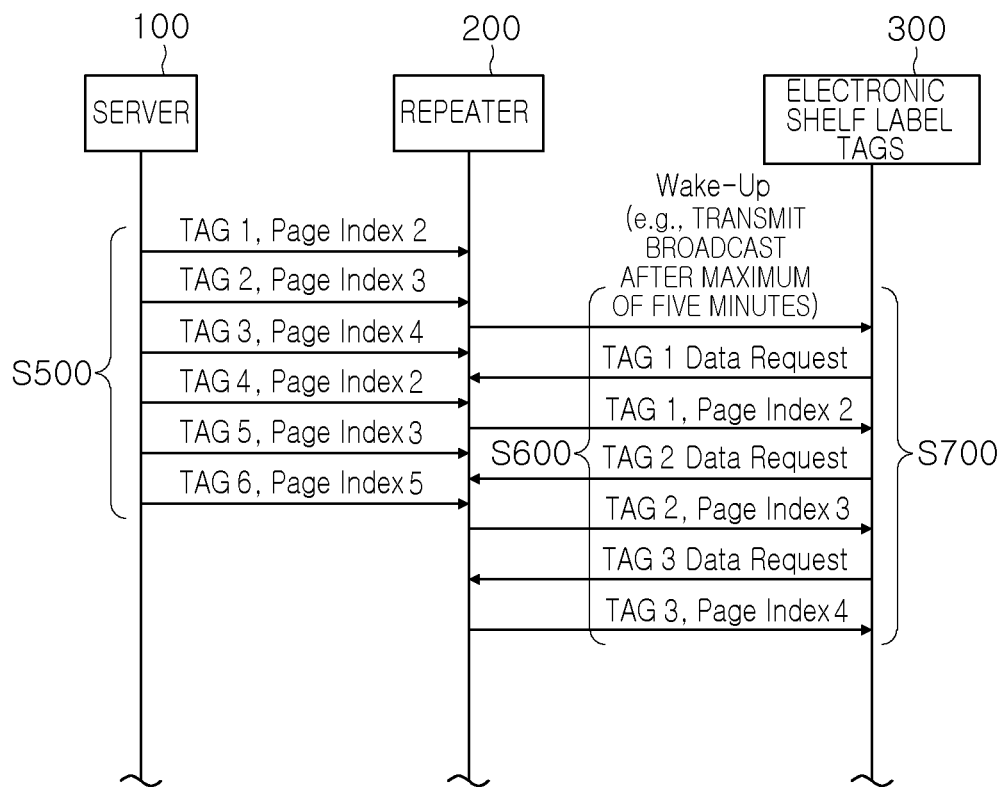
FIG. 13 is a view illustrating an example of an update scenario of display information.

FIG. 13 is a view illustrating an example of an update scenario of display information.

In the example in FIG. 13, TAG 1, TAG 2, TAG 3, TAG 4, TAG 5, and TAG 6 are MAC addresses of the electronic shelf label tags 300, and a page index N (where N is a page number) denotes that a change to an N-th page is be performed. In addition, a page in FIG. 13 is one example of display information, and a page index N in FIG. 13 is a display information index.

Referring to FIG. 13, when the server 100 transmits a control signal for changing a front page of the electronic shelf label tags 300 to the repeater (gateway) 200, the repeater (gateway) 200 transmits a wake-up signal to the electronic shelf label tags 300 to wake up the electronic shelf label tags 300 after a predetermined time. The wake-up signal may be periodically transmitted. For example, when a transmission period of the wake-up signal is five minutes, an update may be performed to change the front page of the electronic shelf label tags 300 after a maximum of five minutes.

For example, when one of the electronic shelf label tags 300 transmits a data request to the repeater (gateway) 200 after the electronic shelf label tag 300 receives the wake-up signal from the repeater (gateway) 200, the repeater (gateway) 200 compares the MAC address of the electronic shelf label tag 300 in the data request with MAC addresses of the electronic shelf label tags 300 stored in the repeater (gateway) 200. Then, if there is information to be updated for the electronic shelf label tag 300, the repeater (gateway) 200 includes the corresponding page index in the control signal and transmits the control signal to the electronic shelf label 300 so that the electronic shelf label tag 300 displays a page mapped to the corresponding page index.

For example, as illustrated in FIG. 13, the electronic shelf label tag 300 having the MAC address TAG 1 transmits a data request including the MAC address TAG 1 to the repeater (gateway) 200. The repeater (gateway) 200 compares the MAC address TAG 1 in the data request with the MAC addresses TAG 1, TAG 2, TAG 3, TAG 4, TAG 5, and TAG 6 of the electronic shelf label tags 300 stored in the repeater (gateway) 200, and determines that a page index 2 is stored in association with the MAC address TAG 1. The repeater (gateway) 200 includes the MAC address TAG 1 and the page index 2 in the control signal, and transmits the control signal to the electronic shelf label tag having the MAC address TAG 1, which displays a page mapped to the page index 2.

FIG. 14 is a view illustrating an example of a plurality of events according to respective update scenarios for a plurality of electronic shelf label tags.

In the example in FIG. 14, the server includes respective update scenarios for the plurality of electronic shelf label tags.

Referring to the update scenarios illustrated in FIG. 14, scenarios for the first to N-th electronic shelf label tags Tag 1 to Tag N include first to sixth events Event #1 to Event #6 and different schedule times. A horizontal length of the first to sixth events Event #1 to Event #6 denotes a relative length of the schedule time.

In the examples of the electronic shelf label system described above, after the display information, such as an image having a large size, is transmitted to the plurality of electronic shelf label tags in advance, the server controls the update for the plurality of electronic shelf label tags using the control signal having a low size.

Since data having a large size is transmitted in advance, a problem due to communications interference or communications disruption may be solved. Thereafter, since the update for the electronic shelf label tags is controlled by the control signal, various situation changes may also be managed.

In addition, a specific electronic shelf label tag may be controlled, or all of the plurality of electronic shelf label tags may be collectively controlled simultaneously. If a series of update scenarios are used, various front page change effects such as a collective operation or a sequential operation for the plurality of electronic shelf label tags may be produced.

In the examples described above, since the electronic shelf label tag receives the display data in advance and stores the display data, the electronic shelf label tag may change the current display information to the display information mapped to the display information index in response to only the control signal having a small size to perform a price update when a price change is desired.

In addition, the plurality of electronic shelf label tags may also simultaneously display the same display information on the screen in response to only the change command from the server.

As such, in a state in which the plurality of display information is transmitted to the plurality of electronic shelf label tags in advance, the display operation may be controlled according to an event schedule in the server, and even in the case in which the event schedule is changed depending on several environmental changes, a proper action may be taken by changing a schedule time for the corresponding display information.

The electronic shelf label server 100, the electronic shelf label repeaters 200, the electronic shelf label tags 300, the communications unit 310, the control unit 320, the memory unit 330, the display unit 340, and the time managing unit 350 illustrated in FIGS. 1, 2, 4-6, 9, 10, 12, and 13 that perform the operations described herein with respect to FIGS. 1-14 are implemented by hardware components. Examples of hardware components include controllers, generators, drivers, memories, wi-fi modules, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4 and 9-13 that perform the operations described herein with respect to FIGS. 1-14 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic shelf label tag comprising:
   a communications unit configured to wirelessly communicate with an electronic shelf label repeater;
   a control unit configured to control operations comprising:
      receiving display data comprising display information mapped to a display information index from the communications unit prior to a preset time;
      storing the display data;
      receiving change command data comprising the display information index from the communications unit after the preset time;
      retrieving the display information mapped to the display information index included in the change command data from the stored display data; and
      displaying the retrieved display information on a screen;
   a memory unit configured to store the display data comprising the display information mapped to the display information index under the control of the control unit; and
   a display unit configured to display the retrieved display information on the screen under the control of the control unit.

2. The electronic shelf label tag of claim 1, wherein the memory unit is further configured to store an index-display information lookup table storing display information 1 to display information N respectively mapped to display information indexes P1 to PN.

3. The electronic shelf label tag of claim 1, wherein the display information comprises any one or any combination of any two or more of information related to a corresponding product, marketing information, and sales-related information.

4. The electronic shelf label tag of claim 1, wherein the communications unit is further configured to receive the change command data from the electronic shelf label repeater in a broadcast packet signal.

5. The electronic shelf label tag of claim 1, wherein the change command data further comprises an event in which schedule time information is mapped to the display information index; and
   the communications unit is further configured to receive the change command data from the electronic shelf label repeater in a broadcast packet signal.

6. The electronic shelf label tag of claim 1, wherein the change command data further comprises identification information of the electronic shelf label tag; and
   the communications unit is further configured to receive the change command data from the electronic shelf label repeater in a unicast packet signal.

7. The electronic shelf label tag of claim 1, wherein the change command data further comprises identification information of the electronic shelf label tag, and an event in which schedule time information is mapped to the display information index; and
   the communications unit is further configured to receive the change command data from the electronic shelf label repeater in a unicast packet signal.

8. The electronic shelf label tag of claim 1, further comprising a time managing unit configured to provide current time information to the control unit, receive time information from the electronic shelf label repeater, and update the current time information based on the received time information.

9. An operating method of an electronic shelf label tag, the operating method comprising:
   receiving, by an electronic shelf label tag, a data signal comprising display data comprising display information mapped to a display information index from an electronic shelf label repeater prior to a preset time;
   storing, by the electronic shelf label tag, the display data included in the data signal;
   receiving, by the electronic shelf label tag, a control signal comprising change command data comprising the display information index from the electronic shelf label repeater after the preset time;
   retrieving, by the electronic shelf label tag, the display information mapped to the display information index included in the change command data of the control signal from the stored display data; and displaying, by the electronic shelf label tag, the retrieved display information on a screen.

10. A non-transitory computer-readable storage medium storing instructions to cause a computer to perform the operating method of claim 9.

11. An electronic shelf label system comprising:

an electronic shelf label server configured to generate and transmit display data comprising display information mapped to a display information index, and transmit change command data for changing the display information;

an electronic shelf label repeater configured to transmit, prior to a preset time, a data signal comprising the display data transmitted by the electronic shelf label server, and transmit, after the preset time, a control signal comprising the change command data transmitted by the electronic shelf label server; and an electronic shelf label tag configured to wirelessly communicate with the electronic shelf label repeater, the electronic shelf label tag comprising:

a communications unit configured to receive the data signal from the electronic shelf label repeater prior to the preset time, and receive the control signal from the electronic shelf label repeater after the preset time;

a control unit configured to control operations comprising:

storing the display data included in the data signal;

receiving the change command data included in the control signal after the preset time;

retrieving the display information mapped to the display information index included in the change command data from the stored display data; and displaying the retrieved display information on a screen;

a memory unit configured to store the display data comprising the display information mapped to the display information index under the control of the control unit; and a display unit configured to display the retrieved display information on the screen under the control of the control unit.

12. The electronic shelf label system of claim 11, wherein the electronic shelf label server is further configured to store an update scenario comprising an event comprising the display information index and a schedule time mapped to the display information index for updating the display information for each of a plurality of electronic shelf label tags comprising the electronic shelf label tag; and the change command data further comprises the update scenario.

13. The electronic shelf label system of claim 11, wherein the display information comprises any one or any combination of any two or more of information related to a corresponding product, marketing information, and sales-related information.

14. The electronic shelf label system of claim 11, wherein the electronic shelf label repeater is further configured to transmit the control signal comprising the change command data in a broadcast packet signal; and the communications unit is further configured to receive the receive the broadcast packet signal.

15. The electronic shelf label system of claim 11, wherein the change command data further comprises an event in which schedule time information is mapped to the display information index;

the electronic shelf label repeater is further configured to transmit the control signal comprising the change command data in a broadcast packet signal; and the communications unit is further configured to receive the receive the broadcast packet signal.

16. The electronic shelf label system of claim 11, wherein the change command data further comprises identification information of the electronic shelf label tag;

the electronic shelf label repeater is further configured to transmit the control signal comprising the change command data in a unicast packet signal; and the communications unit is further configured to receive the receive the unicast packet signal.

17. The electronic shelf label system of claim 11, wherein the change command data further comprises an event in which schedule time information is mapped to the display information index;

the electronic shelf label repeater is further configured to transmit the control signal comprising the change command data in a unicast packet signal; and the communications unit is further configured to receive the receive the unicast packet signal.

18. The electronic shelf label system of claim 11, wherein the electronic shelf label repeater is further configured to transmit time information; and the electronic shelf label tag further comprises a time managing unit configured to provide current time information to the control unit, receive the time information from the electronic shelf label repeater, and update the current time information based on the received time information.

19. An operating method of an electronic shelf label system, the operating method comprising:

generating, by an electronic shelf label server, display data comprising display information mapped to a display information index;

transmitting, by the electronic shelf label server, the display data to an electronic shelf label repeater;

transmitting, by the electronic shelf label repeater prior to a preset time, a data signal comprising the display data transmitted by the electronic shelf label server;

receiving, by the electronic shelf label tag prior to the preset time, the data signal from the electronic shelf label repeater;

storing, by the electronic shelf label tag, the display data included in the data signal;

transmitting, by the electronic shelf label server, change command data comprising the display information index to the electronic shelf label repeater;

transmitting, by the electronic shelf label repeater after the preset time, a control signal comprising the change command data to the electronic shelf label tag;

receiving, by the electronic shelf label tag, the control signal from the electronic shelf label repeater;

retrieving, by the electronic shelf label tag, the display information mapped to the display information index included in the change command data included in the control signal from the stored display data; and displaying, by the electronic shelf label tag, the retrieved display information on a screen.

20. The operating method of claim 19, wherein the transmitting and the receiving of the data signal comprise:

transmitting, by the electronic shelf label repeater, a wake-up signal;

receiving, by the electronic shelf label tag, the wake-up signal from the electronic shelf label repeater;

transmitting, by the electronic shelf label tag, a data information request signal in response to the wake-up signal;

receiving, by the electronic shelf label repeater, the data information request signal from the electronic shelf label tag;

transmitting, by the electronic shelf label repeater, a data information response signal in response to the data information request signal;

receiving, by the electronic shelf label tag, the data information response signal from the electronic shelf label repeater;

transmitting, by the electronic shelf label tag, a data request signal in response to the data information response signal;

receiving, by the electronic shelf label repeater, the data request signal;

transmitting, by the electronic shelf label repeater, a data response signal comprising the data signal in response to the data request signal; and receiving, by the electronic shelf label tag, the data response signal comprising the data signal from the electronic shelf label repeater.

21. The operating method of claim 19, wherein the display information comprises any one or any combination of any two or more of information related to a corresponding product, marketing information, and sales-related information.

22. The operating method of claim 19, wherein the control signal targets a plurality of electronic shelf label tags comprising the electronic shelf label tag.

23. The operating method of claim 19, wherein the control signal targets only the electronic shelf label tag.

24. The operating method of claim 19, wherein the transmitting of the control signal comprises transmitting, by the electronic shelf label repeater, the control signal in a broadcast packet signal; and the receiving of the control signal comprises receiving, by the electronic shelf label tag, the broadcast packet signal from the electronic shelf label repeater.

25. The operating method of claim 19, wherein the change command data further comprises an event in which schedule time information is mapped to the display information index;

the transmitting of the control signal comprises transmitting, by the electronic shelf label repeater, the control signal in a broadcast packet signal; and the receiving of the control signal comprises receiving, by the electronic shelf label tag, the broadcast packet signal from the electronic shelf label repeater.

26. The operating method of claim 19, wherein the change command data further comprises identification information of the electronic shelf label tag;

the transmitting of the control signal comprises transmitting, by the electronic shelf label repeater, the control signal in a unicast packet signal; and the receiving of the control signal comprises receiving, by the electronic shelf label tag, the unicast packet signal from the electronic shelf label repeater.

27. The operating method of claim 19, wherein the change command data further comprises identification information of the electronic shelf label tag and an event in which schedule time information is mapped to the display information index;

the transmitting of the control signal comprises transmitting, by the electronic shelf label repeater, the control signal in a unicast packet signal; and the receiving of the control signal comprises receiving, by the electronic shelf label tag, the unicast packet signal from the electronic shelf label repeater.

28. The operating method of claim 19, further comprising:

transmitting, by the electronic shelf label repeater, time information;

receiving, by the electronic shelf label tag, the time information from the electronic shelf label repeater; and updating, by the electronic shelf label tag, current time information of the electronic shelf label tag based on the received time information.

29. An electronic shelf label tag comprising:

a display unit configured to display display information on a screen;

a memory unit;

a communications unit configured to wirelessly receive updated display information from an electronic shelf label repeater prior to a scheduled update time, and wirelessly receive an update command identifying the updated display information from the electronic shelf label repeater at the scheduled update time; and a control unit configured to:
  receive the updated display information from the communications unit;
  store the updated display information in the memory unit;
  receive the update command from the communications unit;
  retrieve the updated display information from the memory unit based on the update command; and
  control the display unit to display the updated display information on the screen at the scheduled update time.

30. The electronic shelf label tag of claim 29, wherein the electronic shelf label repeater is configured to transmit the updated display information sufficiently far in advance of the scheduled update time to ensure that the updated display information will available in the memory unit at the scheduled update time.

31. The electronic shelf label tag of claim 29, wherein the updated display information is mapped to a display information index;

the update command comprises the display information index; and the control unit is further configured to store the updated display information in the memory unit indexed according to the display information index, and retrieve the updated display information index from the memory unit based on the display information index included in the update command.

32. The electronic shelf label tag of claim 29, wherein the communications unit is configured to receive the update command in a broadcast packet signal targeting the electronic shelf label tag and other electronic shelf label tags.

33. The electronic shelf label tag of claim 29, wherein the communications unit is configured to receive the update command in a unicast packet signal targeting only the electronic shelf label tag.

* * * * *